United States Patent [19]

Munnion

[11] Patent Number: 4,578,708

[45] Date of Patent: Mar. 25, 1986

[54] CAMERA SUPPORT ASSEMBLY

[75] Inventor: Derek Munnion, Andover, England

[73] Assignee: Link Electronics Limited, England

[21] Appl. No.: 531,210

[22] Filed: Sep. 9, 1983

[30] Foreign Application Priority Data

Sep. 9, 1982 [GB] United Kingdom ................. 8225700

[51] Int. Cl.⁴ ............................................ H04N 5/225
[52] U.S. Cl. .................................... 358/229; 352/243; 354/293
[58] Field of Search ................. 354/293, 288, 286, 74, 354/81; 358/225, 229, 227, 248, 209; 352/243, 242; 294/139; 224/908; 350/245, 252

[56] References Cited

U.S. PATENT DOCUMENTS

| 3,511,159 | 5/1970 | Hobbs | 354/293 |
| 3,589,260 | 6/1971 | Ferra | 354/293 |
| 4,083,480 | 4/1978 | Lee et al. | 358/229 |

Primary Examiner—Tommy P. Chin
Attorney, Agent, or Firm—Remy J. VanOphem

[57] ABSTRACT

A camera support assembly, particularly for television cameras, which includes a base providing an elongate slide bed, and first and second slide carriages slidable on the bed, the first and second slide carriages being attached to a camera and a lens, respectively. The slide bed has longitudinal sides which converge inwardly as they extend upwardly so as to laterally retain complementary formations on the slide carriages.

5 Claims, 2 Drawing Figures

CAMERA SUPPORT ASSEMBLY

BACKGROUND OF THE INVENTION

1. Field of Invention

The present invention relates to a camera support assembly and finds particular application to the support of a television broadcast camera.

2. Description of Prior Art

The balance of a camera, such as a television broadcast camera, is of increasing significance due to the dramatic reduction in space and weight required for the electronic components of the camera. In the past, the housing required for the electronics of a television broadcadt camera was large enough to balance the camera lens. The center of gravity of such a camera can be identified in relation to a specific point on the camera casing. An attachment mechanism can be readily provided at that location for connecting the camera to a tripod or other supporting device. The reduction in space required for the electronic components of a television broadcast camera has resulted in such cameras having insufficient weight to balance the lens. With this arrangement the center of gravity of the camera plus lens may be very close to the point of connection between the lens and camera. A major problem also is the bending loads which are applied to the connection between the lens and camera.

SUMMARY OF THE INVENTION

With a view to mitigating the above-mentioned disadvantages, the present invention provides a camera support assembly which includes a base that provides an elongate slide bed, a first slide carriage for attachment to a camera and a second slide carriage for attachment to a camera lens, the slide carriages being slidable longitudinally along the slide bed, thereby providing ready adjustment of the center of gravity of a supported camera and lens, with respect to the base, while mitigating bending loads between the camera and lens.

In this arrangement the camera and lens are independently supported, and bending loads at the junction between the lens and the camera body can be greatly reduced as compared with direct support of the camera alone.

Preferably, the slide bed has side walls for laterally restraining the slide carriages. Advantageously, the free longitudinal edges of the side walls converge and the slide carriages have complementary configurations such that the carriages can only be displaced longitudinally along the base.

BRIEF DESCRIPTION OF THE DRAWINGS

An embodiment of the present invention will now be described by way of example only and with reference to the accompanying drawings, in which.

DESCRIPTION OF THE PREFERRED EMBODIMENT

Figure 1:
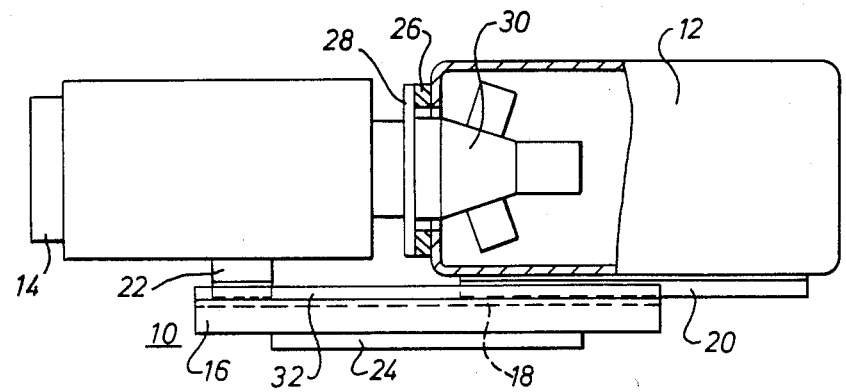
FIG. 1 is a front elevational view, partially in section, of a camera and lens supported on a camera support assembly.

A camera support assembly 10 is provided for supporting a camera 12 and a lens 14. The support assembly 10 has a base 16 which defines an elongate slide bed 18. A camera slide 20 is attached to the camera 12 and a lens slide 22 is attached to the lens 14.

The slides 20 and 22 are slidable longitudinally along the slide bed 18 and ready adjustment of the center of gravity of the camera 12 and lens 14 with respect to the base 16 is thereby provided.

The underneath of the base 16 is provided with an attachment fixture 24 which provides connection for a variable height support, such as a tripod. The tripod or the like (not shown) will normally be mounted on a movable trolley.

Independent support of the camera 12 and the lens 14, as provided by the slides 20 and 22, respectively, results in the virtual elimination of bending loads which may otherwise be applied at the connection between the lens 14 and camera 12. In particular, the camera support assembly 10 is convenient for use with a camera and lens combination in which the lens 14 is connected to the camera 12 by means of a resilient suspension unit 26. The lens 14 connects with a connector 28 which is mounted to the camera 12 by the suspension unit 26. Small displacements of the lens 14 relative to the camera 12 are absorbed by the suspension unit 26. In such an arrangement it is necessary for an optical unit 30 to be accurately clamped to the lens 14. This is achieved by the optical unit 30 being rigidly secured to the connector 28. Use of the resilient suspension unit 26 is permissible due to the relative precision with which the camera 12 and lens 14 can be moved so as to adjust the center of gravity of the combination with respect to the tripod or other support.

Figure 2:
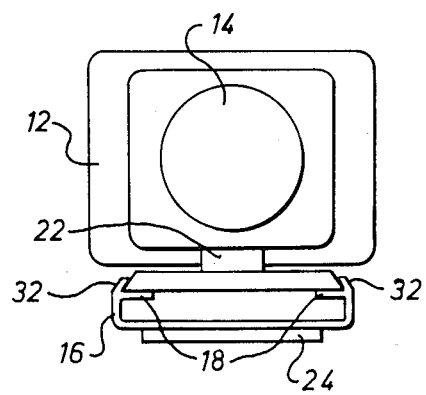
FIG. 2 is an end elevational view of the arrangement shown in FIG. 1.

As can be most clearly seen from FIG. 2, the slide bed 18 has longitudinal side walls 32, and the top edges of the side walls converge inwardly as they extend upwardly from the other elements of the slide bed. The slides 20 and 22 have complementary configurations such that the slides can only move longitudinally along the slide bed 18 and cannot be withdrawn vertically from the base 16.

Modifications of various aspects of the above embodiment without departing from the scope of this invention will be readily apparent to those skilled in the art.

I claim:

1. A camera support assembly for supporting a camera and a lens for said camera, said assembly comprising:

a base providing an elongate slide bed, a first slide carriage for attachment to said camera and a second slide carriage for attachment to said lens, said first and second slide carriages being slidable longitudinally along said slide bed to provide ready adjustment of the center of gravity of said camera and said lens with respect to said base and to mitigate bending loads between said camera and said lens;

an optical unit, said optical unit being connected to said lens; and suspension means for suspending said camera and said lens to maintain said camera in operative engagement with said lens, said suspension means comprising a resilient suspension unit for resiliently suspending said camera in operative engagement with said lens to provide for small displacements of said lens relative to said camera.

2. A camera support assembly as claimed in claim 1, wherein said camera is a television camera.

3. A camera support assembly as claimed in claim 1, wherein said slide bed comprises side walls for laterally restraining said first and second slide carriages.

4. A camera support assembly as claimed in claim 3, wherein said side walls have free longitudinal edges which extend upwardly and converge inwardly as they extend upwardly, and wherein said first and second slide carriages have complementary configurations such that said first and second slide carriages can only be displaced longitudinally along said slide bed.

5. A camera support assembly as claimed in claim 1, wherein said base comprises means for mounting said assembly to a variable height support.

* * * * *